Patented Feb. 17, 1948

2,436,220

UNITED STATES PATENT OFFICE 2,436,220

DIMETHYL SILICONE ELASTOMERS CONTAINING LEAD MONOXIDE

James Marsden and George F. Roedel, Schenectady, N. Y., assignors to General Electric Company, a corporation of New York No Drawing. Application August 11, 1944, Serial No. 549,128

5 Claims. (Cl. 260—46.5)

The present invention relates to dimethyl silicone elastomers. It is particularly concerned with silicone elastomers containing lead monoxide as an active filler.

Dimethyl silicone elastomers and methods of preparing such elastomers are described in the copending application of Maynard C. Agens, Serial No. 526,473, and the copending application of James G. E. Wright and Curtis S. Oliver, Serial No. 526,472, both of which applications were filed March 14, 1944, and assigned to the same assignee as the present invention.

Briefly described, the silicone elastomers comprise mixtures of (1) dimethyl silicone gums obtained by treating liquid dimethyl silicones, for example, with ferric chloride or mixtures of ferric oxide and aluminum chloride and (2) suitable fillers. The methyl-to-silicon ratio of the gums ranges from 1.98 to 2.00. To obtain elastomers which can be rapidly cured for example in a closed mold, small amounts of benzoyl peroxide are added to the gum-filler mixture at the time the gum and filler are worked on the rubber rolls. In the cured or vulcanized state the resultant elastomers possess some of the properties of vulcanized natural rubber and are particularly characterized by their flexibility at low temperatures and their resistance to heat.

The present invention is particularly concerned with silicone elastomers prepared from silicone gums containing metal halides or other compounds which may liberate hydrogen halides such, for example, as the gums obtained by contacting dimethyl silicone oils containing from 1.98 to 2.0 methyl groups per silicon atom with an iron halide such as ferric chloride or its hexahydrate. The invention is based on the discovery that further improvements in the temperature resistance of these elastomers are obtained by the addition of small amounts of lead monoxide to the gum along with the usual fillers. The proportions of lead monoxide added to the elastomer depend on the amounts of metal halide such as ferric chloride present therein. Ordinarily the lead monoxide content should be between 1–2 times the theoretical amount of lead oxide necessary to react with metal halide used in the preparation of gum and assumed to be present in the gum. For example, a gum prepared by use of 0.3 per cent by weight of ferric chloride based on the weight of the gum will require from 0.5 to 1.0 per cent lead monoxide based on the weight of the gum. When larger quantities of the iron halide, for example 5 per cent, are present in the gum, up to 10 per cent lead monoxide may be used. The improvements obtained by the incorporation of lead monoxide into the metal halide-containing gums is believed to result from a reaction of the monoxide with the metal halide such as ferric chloride, thereby eliminating it and the depolymerizing action of such a halide at elevated temperatures.

The following data show the effect of PbO on the weight loss and hardness of a silicone elastomer when heated at 150 deg. C. for a total of 140 days. The gum used in this case was prepared by polymerizing a dimethyl silicone with 1 per cent of $FeCl_3.6H_2O$. Compound A was made by milling 100 parts of gum with 200 parts of $TiO_2$ and 2 parts of benzoyl peroxide. Compound B was made in the same way except that 1 part PbO was added during milling. The compounds were pressed for 10 minutes at 150 deg. C.

| Compound | After molding Hardness | After 79 days heating | | After 140 days heating | |
|---|---|---|---|---|---|
| | | Wt. Loss [1] | Hardness | Wt. Loss [1] | Hardness |
| | | Per cent | | Per cent | |
| A | 22 | 24.7 | 63 | 44.8 | 90 |
| B | 30 | 17.0 | 58 | 23.0 | 60 |

[1] Weight loss based on weight of gum present in elastomer.

The above results show that lead monoxide is instrumental in reducing the weight loss of the elastomer containing a metal halide such as ferric chloride and in reducing the relative hardness of the silicone elastomer when heated at elevated temperatures. In addition, the elastomer containing PbO is more flexible after ageing for 140 days. It is believed that the $FeCl_3$ causes depolymerization of silicone elastomer to more volatile products, either lower molecular weight polysilicones or polysiloxane chlorides. The incorporation of lead oxide in the elastomer provides a method for removing the iron halide from the insoluble gums. A large excess of lead oxide over that necessary to react with the metal halide should not be used since it also tends to reduce the temperature resistance of the product, presumably by increasing the rate of oxidation of the elastomer.

What we claim as new and desire to secure by Letters Patent of the United States is:

1. An elastomeric body comprising the heat-treated mixture of ingredients comprising (1) a dimethyl silicone gum having an average of from 1.98 to 2.00 methyl groups per silicon atom and containing from 0.3 to 5 per cent ferric chloride hexahydrate and (2) lead monoxide in an amount ranging from 1 to 2 times the amount of ferric chloride present in said gum.

2. A silicone elastomer comprising (1) a dimethyl silicone gum having an average of from 1.98 to 2.00 methyl groups per silicon atom and containing from 0.3 to 5 per cent, by weight, ferric chloride, and (2) lead monoxide in an amount ranging from 1 to 2 times the amount of ferric chloride present in said gum.

3. The process of preparing a silicone elastomer of high temperature resistance which comprises contacting liquid dimethyl silicone with from 0.3 to 5 percent, by weight, ferric chloride hexahydrate to convert said liquid silicone to a gum having an average methyl-to-silicone ratio of from 1.98 to 2.00 and mixing said gum with a filler and from 1 to 2 times the amount of lead monoxide calculated as necessary to react with the ferric chloride present in said gum.

4. The process of improving the temperature resistance of a silicone elastomer prepared from silicone gum obtained by contacting a liquid dimethyl silicone containing an average of from 1.98 to 2.00 methyl groups per silicon atom with from 0.3 to 5 per cent, by weight, of a ferric chloride, which process comprises incorporating into the said gum during the preparation of the elastomer an amount of lead monoxide equal to from 1 to 2 times the amount of ferric chloride present in the said gum.

5. A composition of matter comprising (1) a dimethyl silicone gum having a methyl-to-silicon ratio of from 1.98 to 2.00 and containing from 0.3 to 5 per cent, by weight, of a ferric chloride, and (2) lead monoxide in an amount ranging from 1 to 2 times the amount of ferric chloride in said gum.

JAMES MARSDEN.
GEORGE F. ROEDEL.